United States Patent [19]
Duboué

[11] Patent Number: 5,356,236
[45] Date of Patent: Oct. 18, 1994

[54] DEVICE FOR CONNECTING TWO ELEMENTS IN ROTATION

[75] Inventor: Jean Duboué, Assat, France

[73] Assignee: Turbomeca, Bordes, France

[21] Appl. No.: 173,132

[22] Filed: Dec. 21, 1993

Related U.S. Application Data

[63] Continuation-in-part of Ser. No. 945,278, Sep. 15, 1992, abandoned.

[30] Foreign Application Priority Data

Sep. 25, 1991 [FR] France ............... 91 11802

[51] Int. Cl.$^5$ ............................................. F16D 1/06
[52] U.S. Cl. .................................. 403/359; 403/13; 403/343
[58] Field of Search ............ 403/359, 118, 259, 13, 403/14, 343, 298, 345; 464/179, 182, 162

[56] References Cited

U.S. PATENT DOCUMENTS

| | | | |
|---|---|---|---|
| 2,978,885 | 4/1961 | Davison | 464/182 X |
| 4,295,751 | 10/1981 | Holmberg | 403/343 X |
| 4,449,957 | 5/1984 | Kapaan | 403/259 X |
| 4,476,666 | 10/1984 | van der Lely et al. | 56/13.6 |
| 4,624,596 | 11/1986 | Eckendorff | 403/259 X |
| 4,668,116 | 5/1987 | Ito | 403/359 X |
| 4,943,094 | 7/1990 | Simmons | 403/13 X |
| 5,060,740 | 10/1991 | Yousef et al. | 403/343 X |

FOREIGN PATENT DOCUMENTS

| | | | |
|---|---|---|---|
| 1061458 | 7/1959 | Fed. Rep. of Germany | 403/343 |
| 880493 | 1/1943 | France | 403/359 |
| 220808 | 7/1942 | Switzerland | 403/343 |

Primary Examiner—Randolph A. Reese
Assistant Examiner—Harry C. Kim
Attorney, Agent, or Firm—Martin Smolowitz

[57] ABSTRACT

A device for connecting in rotation two substantially coaxial elements (10,12), of the type comprising a splined shaft (10,20), a splined hub (24) and clamping elements for achieving a relative axial immobilization between the splined shaft and splined hub. A first end portion of the splined shaft (20) is provided with a centering ring (30) having an outer surface (34) including an outer screw threading (36) having unsymmetrical flanks, which ring (30) is screw-threadedly mounted in a corresponding portion (42) of the splined hub (24) comprising a complementary tapping (44) having unsymmetrical flanks. The second end portion (46) of the splined shaft (20) comprises an outer screw threading (48) on which is screw-threadedly mounted an axial clamping nut (50) having a radial face (52) cooperating with a confronting radial face (54) on the splined hub (24). The invention is of utility in connecting in rotation a power shaft and a rotating element of a turbomachine.

2 Claims, 1 Drawing Sheet

DEVICE FOR CONNECTING TWO ELEMENTS IN ROTATION

This application is a continuation-in-part division, of application Ser. No. 07/945,278, filed Sep. 15, 1992, now abandoned.

BACKGROUND OF THE INVENTION

The present invention relates to a device for connecting two substantially coaxial elements in rotation about a common axis.

The invention concerns a device of the type comprising a splined shaft and a splined hub for the two connected elements, and clamping means for achieving a relative axial immobilization of the two splined members.

The invention more particularly concerns a connecting device for ensuring the transmission of power and the geometric centering between two rotatable elements, such as for example a power shaft and a bladed wheel of a turbomachine.

Among splined connecting devices there are those whose splines have straight flanks and those whose splines have involute flanks. In the case of splines having involute flanks, the male and female splined elements are automatically centered relative to each other under the effect of the applied torque. In use, it is found that this type of arrangement is only suitable for shafts rotating at low speeds and is unsatisfactory for shafts having high speeds of rotation.

SUMMARY OF THE INVENTION

An object of the present invention is to ensure, in a device for connecting in rotation by means of mating splines, and a centering ring a geometric centering of a splined shaft relative to a splined hub which is as precise as possible.

The invention therefore provides a connecting device of the aforementioned type, characterized in that a first end portion of the splined shaft is provided with a centering ring having an outer surface comprising an outer screw threading having unsymmetrical flanks and which is screw-threadedly mounted in a corresponding portion of the splined hub comprising a complementary tapping having unsymmetrical flanks, and a second end portion of the splined shaft comprises a second outer screw threading on which is screw-threadedly mounted an axial clamping nut having a radial face cooperative with a confronting radial face of the splined hub.

According to another feature of the invention, the radial face of the clamping nut faces toward the first end portion of the splined shaft, and the centering ring comprises a radial bearing face which faces toward the first end portion of the splined shaft and axially bears against a confronting radial face of the splined shaft.

Further features and advantages of the invention will appear from the following detailed description with reference to the accompanying drawings.

DETAILED DESCRIPTION OF AN EMBODIMENT

Figure 1:
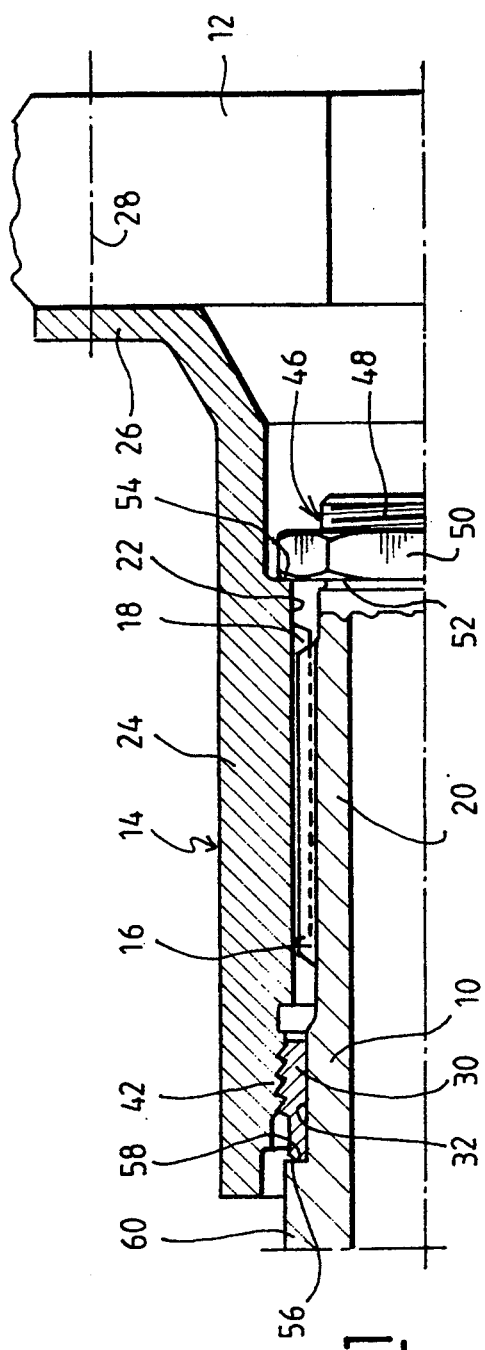
FIG. 1 is an axial sectional view of a connecting device constructed in accordance with the teaching of the invention.

FIG. 1 illustrates a power transmission shaft 10 which is connected to a second element 12, which is for example the hub of a bladed wheel (not shown) of a turbomachine.

The elements 10 and 12 are connected in rotation by a connecting device 14 whose function is to ensure, on one hand, the transmission of power between the two elements 10 and 12 and, on the other hand, a geometric centering of these two elements which is as precise as possible so as to ensure that they are coaxial.

The transmission of the torque is achieved through male splines 16 and female splines 18 respectively formed on the outer surface of the end portion 20 of the shaft 10, and formed in the inner bore 22 of a splined hub 24 which is connected to the element 12 by a radial fixing flange 26 and screw-threaded connections 28 as diagrammatically illustrated in FIG. 1.

The end portion 20 of the shaft 10 therefore constitutes a splined shaft which is received in the splined hub 24. The splines 16 and 18 are complementary splines having straight flanks in respect of which splines there is a normal radial clearance.

According to the essential feature of the invention, the centering of the shaft 10 with respect to the splined hub 24 is achieved by means of a centering ring 30.

The centering ring 30 is mounted on a cylindrical bearing surface 32 located in the vicinity of a first end portion, namely the left end portion as viewed in FIG. 1, of the splined portion 20 of the shaft 10. The inner bore 31 of the centering ring 30 has a diameter slightly larger than the outer diameter of the male splines 16. The outer surface 34 of the centering ring 30 includes screw threading 36 whose flanks are unsymmetric, as illustrated in detail in FIG. 2

Figure 2:
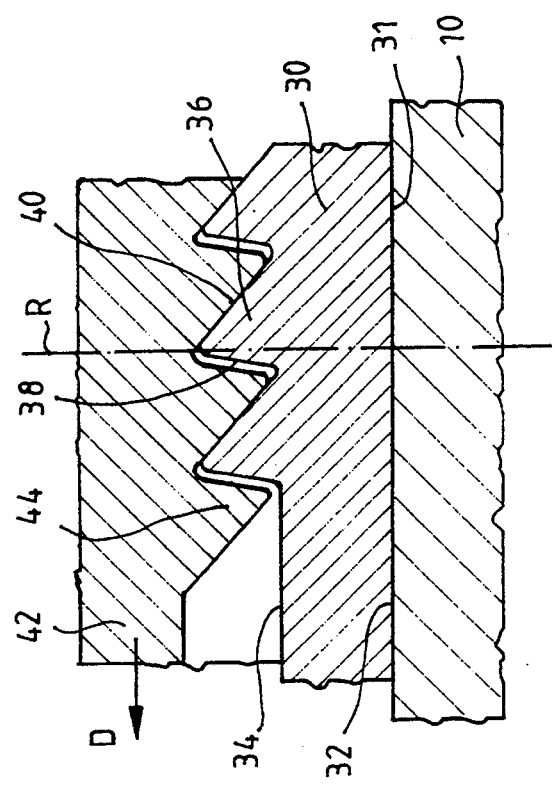
FIG. 2 is a detail view on a larger scale of a portion of the centering ring and its adjacent elements.

FIG. 2 indeed shows that the left flank 38 of the outer thread 36 makes with the radius R passing through the crest of the thread, an acute angle distinctly smaller than that made by the right flank 40 of the outer thread 36.

The centering ring 30 is screw-threadedly mounted in a corresponding portion 42 of the hub 24, having a tapping 44 which has unsymmetrical flanks and is complementary to the outer screw threading 36. The tapping 44 is formed in a portion of the bore 22 in a region in facing relation to the ring 30.

A second end portion 46 of the splined portion 20 of the shaft 10 comprises a conventional outer screw threading 48, that is, screw threading whose flanks are symmetrical, on which is screw-threadedly mounted an axial clamping nut 50 whose left radial face 52 facing toward the centering ring 30 axially bears against a confronting radial face 54 formed in the hub 24.

The relative axial position between the centering ring 30 and the splined shaft 10 is determined by the cooperation of its radial end face 56, which axially bears against a confronting radial face 58 formed by an outer radial shoulder 60 on the shaft 10.

The connecting device just described above is assembled in the following manner.

The operator inserts the shaft 10 inside the hub 24 which is equipped with its centering ring 30 in such manner as to fit the splines 16 and 18 together, the centering ring 30 having been previously screw threaded into end portion 42 of the splined hub 24. The axial clamping together of the assembly is achieved by means of the clamping nut 50.

In the course of this clamping, the nut 50 produces a relative axial displacement between the splined hub 24 and the splined end of the shaft 10. The hub 24 in this way moves in the direction indicated by arrow D in FIG. 2 relative to the centering ring 30.

Owing to the large angle of the slope of the flank 40 of the screw threading 36, there is produced, under the effect of the axial clamping force from the nut 50, a radial clamping of the inner bore 31 of the centering ring 30 on the cylindrical bearing surface 32 and therefore an almost perfect centering of the hub 24 relative to the shaft 10, by means of the ring 30.

The device according to the invention therefore permits achieving in a very simple manner a geometric positioning of the hub 24 with respect to the shaft 10 which is as precise as possible, and the driving of the shaft into the hub under the effect of the axial clamping force applied by the nut 50.

The illustration given in FIGS. 1 and 2 of the invention is diagrammatic and merely has for purpose to illustrate as simply as possible the principle employed in the invention.

It will of course be obvious that, for example, the outer radial shoulder 60 must be arranged in the form of a complementary member as the diameter of the inner bore 31 of the centering ring 30 is large than the outside diameter of the male splines 16.

The fitting between the inner bore 31 and the cylindrical bearing surface 32 is preferably slightly tight in order to guarantee that the clamping effect due to the cooperation between the unsymmetric screw threadings 36 and 44 is fully effective when tightening the nut 50.

It must be understood that the scope of the invention is not intended to be limited to the embodiment just described. Many alternative arrangements, and in particular conventional mechanical inversions, may be envisaged for carrying out the invention.

What is claimed is:

1. Device for connecting in rotation two substantially coaxial elements, said device comprising in combination: a splined shaft having a first end portion comprising male splines and cylindrical bearing surface, a splined hub having female spines, clamping means for achieving a relative axial immobilization between said splined shaft and said splined hub, a centering ring having an inner bore which bears against said cylindrical bearing surface and an outer surface including an outer screw threading having unsymmetrical flanks, said splined hub having a tapping which has unsymmetrical flanks which are complementary to said centering ring outer screw threading which is screw-threadedly mounted in said tapping, said splined shaft having a second end portion comprising an outer screw threading, said clamping means being an axial clamping nut screw-threadedly mounted on said outer screw threading of the splined shaft, said axial clamping nut having a radial face and said splined hub having a radial face which confronts and is cooperative with said radial face on said axial clamping nut.

2. Device according to claim 1, wherein said radial face of said axial clamping nut faces toward said first end portion of said splined shaft, said splined shaft has a radial face and said centering ring has a radial bearing face facing toward said first end portion and bearing axially against said radial face of said splined shaft.

* * * * *